United States Patent [19]

Denman

[11] Patent Number: 4,840,601

[45] Date of Patent: Jun. 20, 1989

[54] SELF BALANCING UNIVERSAL JOINT

[75] Inventor: Stephen A. Denman, Centerville, Ohio

[73] Assignee: Jerome P. Bloom, Englewood, Ohio; a part interest

[21] Appl. No.: 903,662

[22] Filed: Sep. 4, 1986

[51] Int. Cl.⁴ .............................................. F16D 3/18
[52] U.S. Cl. ..................................... 464/157; 403/57; 464/106
[58] Field of Search ......................... 403/57, 119, 364; 464/106, 149, 157, 904

[56] References Cited

U.S. PATENT DOCUMENTS

| | | | |
|---|---|---|---|
| 1,241,118 | 9/1917 | Hoskins | 464/157 |
| 1,263,252 | 4/1918 | Jencick | 464/157 |
| 2,425,809 | 8/1947 | Johnson | 464/157 |
| 2,617,277 | 11/1952 | Sindelar | 464/106 |
| 2,767,564 | 10/1956 | Green | 464/157 |
| 2,928,263 | 3/1960 | Devos | 464/157 X |
| 4,405,040 | 9/1983 | Buschbom et al. | 464/157 X |
| 4,449,956 | 5/1984 | Ueno | 464/157 X |

Primary Examiner—Daniel P. Stodola
Attorney, Agent, or Firm—Jerome P. Bloom

[57] ABSTRACT

A universal joint comprising a pair of coupling devices each including a generally cylindrical portion having an extension at one end including a plurality of projections which are outwardly divergent and circularly spaced. Such projections of each coupling device are arranged to have their successively adjacent side surfaces formed to define therebetween spaces the bounding sides of which are divergent. In the assembled relation of the coupling devices the projections of the respective extensions thereof are relatively rotatively displaced and interfit and the projections of one thereof are respectively projected in, through and beyond the spaces defined between the bounding sides of the projections of the other of said extensions. The projections of said coupling devices as so interrelated are formed and spaced to variously have a slip, sliding and longitudinal and lateral overlapping relation during use of the joint of which they form a part the nature of which is such to induce a self balancing and biasing of the parts of the joint to the positions in which they are set for use thereof.

18 Claims, 3 Drawing Sheets

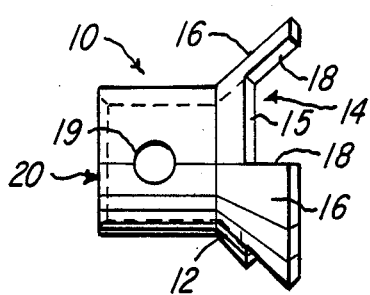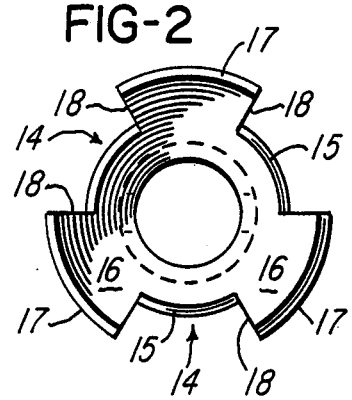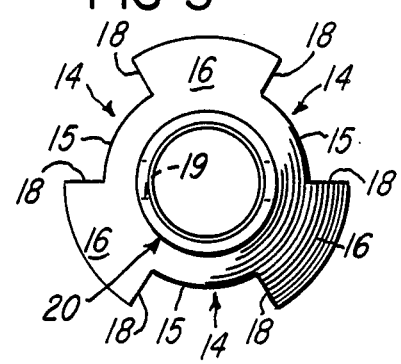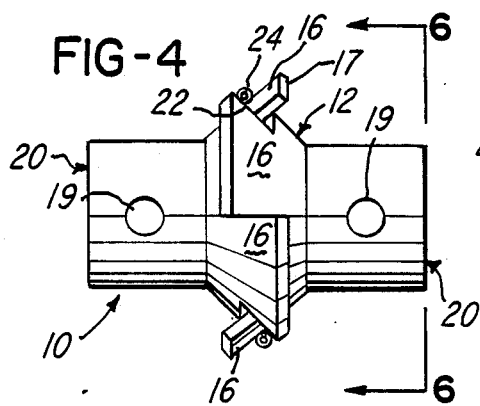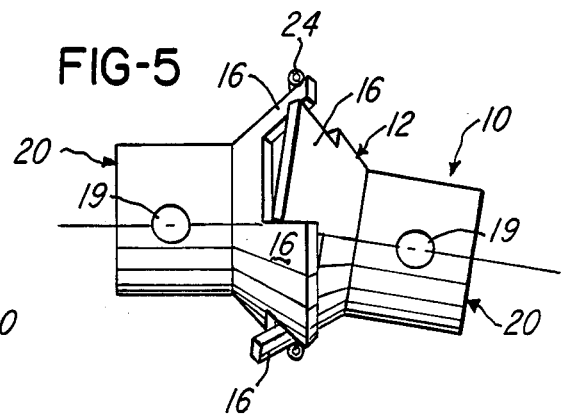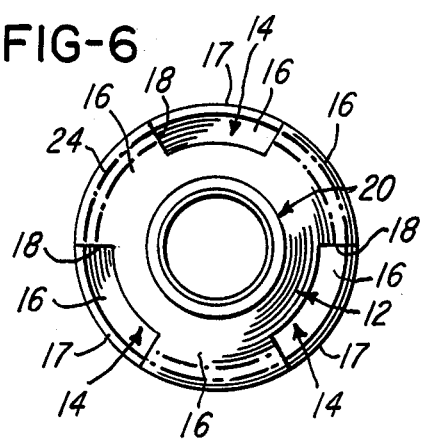

SELF BALANCING UNIVERSAL JOINT

BACKGROUND OF THE INVENTION

This invention relates to universal joints and more particularly to new and improved constructions and arrangements thereof that in comparison to those of the prior art are not only economical to fabricate but more efficient and satisfactory in use and capable of more effectively functioning in a wider variety of applications.

Embodiments are characterized by two elements, units or assemblies adjacent ends of which are of a generally similar construction which provides for a bearing interfit and a relative angularity and interfunction thereof producing a joint distinguished by a constant velocity as between its input and output and its smooth fail safe operation, even under extreme conditions of its usage.

The construction and arrangement of the invention embodiments solve long standing problems such as but not limited to binding, hang up, freezing, fracturing, breaking and even separation of parts, one or more of which has occurred from time to time in use of universal joints of the prior art.

SUMMARY OF THE INVENTION

Embodiments of the invention are basically comprised of two substantially like elements, units or assemblies in end to end relation, the adjacent ends of which overlap each other in part to have a slip, sliding interfit thereof which maintains a relatively controlled bearing relation of one to the other regardless of angle of displacement, roll and slide that occurs in use thereof.

One preferred simplistic embodiment of said elements, units or assemblies comprises a tubular hub an extension of one end of which provides thereon a plurality of longitudinally extending relatively short diverging fingers, adjacent sides of adjacent fingers of which are separated by a space the shape of which has the configuration of a notch directed inwardly of said element and opening therefrom between the projected extremities of the bounding fingers. The widths of said spaces are made slightly greater than the widths of the respective fingers of a substantially like element which they accommodate in the overlapping interfit thereof to form a universal joint per the present invention. The opposite end of said hub is adapted for the coupling thereof to an element of the drive system in which the universal joint of the invention must be inserted.

It is preferred that said extension be an expanding wall structure the configuration of which is generally that of a truncated cone and that said fingers be a part of this configuration. It is pointed out moreover that said notches may be considered and even formed as windows in the conically configured wall structure and used in a manner similar to the spaces defined by said notches, and to good advantage.

In another preferred form of embodiment of the invention a unit or assembly the use of which may be desirable in lieu of the aforementioned element where special loads must be accommodated comprises a tubular or cylindrical hub integrally connected with and forming an axial extension of one end of which is an adapter presenting in or on its projected end surface a plurality of angularly related base bearing surfaces which are circularly and equidistantly spaced. Each of said angularly related bearing surfaces seats thereon, substantially perpendicular thereto, a roller type bearing element having the shape of a truncated cone the smaller diameter or apex end of which bears on its seat. Each roller element has a central throughbore accommodating the projection therethrough of the body of a bolt, the head of which contains it to its seat, as the projected threaded extremity of the bolt is securely anchored in a tapped blind bore which is formed therein. At the same time the roller element is established for rotation on and in bearing relation to that smooth portion of the body of the bolt which extends therethrough.

The adapter is formed with a series of recesses or pockets in the head thereof which are circularly spaced and each positioned between successively adjacent rollers. The construction and arrangement so provided enables a pair of the immediately described units or assemblies to be brought together to have the projections defined by said rollers immediately adjacent, whereupon the one may be advanced into the other thereof to have the rollers of each position in the spaces between the rollers of the other and in an interfitting overlapping relation to its adapter, accommodated by said recesses or pockets which are formed therein.

Various additions to and modifications of the described embodiments are comprehended by the invention, such as the use of a continuous coil spring applied peripherally and intermediately of overlapping and interfit projections such as the mating fingers of a pair of the elements first described upon the use thereof to form a universal joint. Further, where the extension on the hub has an internal flange, for example at the small diameter end of its configuration which is generally similar to that of a truncated cone, a ball bearing element of suitable size may be interposed between the opposing flanges of a pair of said elements which are interfit to form a universal joint the smoothness and facility is somewhat enhanced thereby. Also, as should be obvious, the hubs of a pair of devices such as herein comprehended to form a new and significantly improved universal joint may differ in length without affecting function. To meet the needs of a particular application of a universal joint per the invention, differentials as to the spacing and forms of said projections which interfit may be required. All and any of these modifications, and more, can be employed without departing from the spirit and scope of the present invention. It is noted that these are only by way of illustration and not to be construed as limiting in any respect.

Most significant is the fact that when a drive system incorporating a preferred universal joint per the present invention is in operation and the basic interfitting elements, units and/or assemblies thereof which respectively overlap each other are subjected to conditions which produce a relative angular displacement thereof the forces generated at such time at the points of contact of their mating surfaces are inherently so directed as to urge the interfitting overlapping parts of the joint to a coaxial relation. This not only insures the integrity of the joint but also results in the maintenance of a substantially constant velocity from its input to its output.

In any case the invention simplifies the means and manner in which a durable, fail safe, highly effective and economical universal joint may be achieved, one which minimizes malfunction to the utmost.

Accordingly, it is a primary object of the invention to provide a universal joint which is not only economical to fabricate but, as compared to the prior art, more efficient and satisfactory in use, more adaptable to a wide variety oif applications and unlikely to malfunction.

Another object is to provide new and significantly improved universal joints and components thereof.

A further object is to provide a new and improved universal joint the construction of which inherently inhibits binding, hang up, freezing, fracturing, breaking and even separation of its parts.

An additional object of the invention is to provide a universal joint distinguished by a constant velocity as between its input and output and a smooth fail safe operation thereof, even under extreme conditions of its use.

Another object of the invention is to provide universal joints and components thereof possessing the advantageous features of construction, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not the only forms of embodiment of the present invention, FIG. 1 is a side view of an element of a universal joint per the present invention;

FIG. 2 is a view of its head end;

FIG. 3 is a view taken from the opposite end thereof;

FIG. 4 is a view, in side elevation, of a universal joint utilizing the element demonstrated in FIGS. 1-3;

FIG. 5 is a view similar to that of FIG. 4 wherein the elements of the universal joint have been subjected to displacement in the course of the operation of the drive system of which it forms a part;

FIG. 6 is a view of the structure of FIG. 4 taken on line 6—6 thereof;

Figure 9:
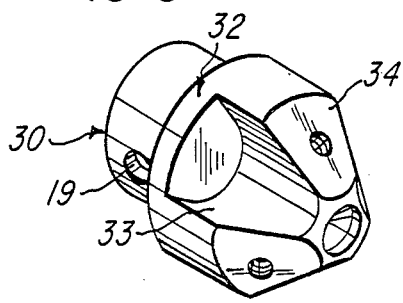
FIG. 9 is a perspective view of the hub forming part of another embodiment of the invention, and the head at one end thereof which defines its extension.
Figure 10:
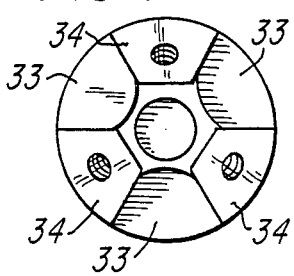
FIG. 10 is a view of the structure of FIG. 9 taken from the head end thereof.
Figure 11:
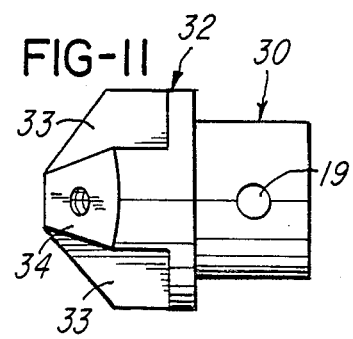
FIG. 11 is a top view of the structure of FIG. 10.
Figure 12:
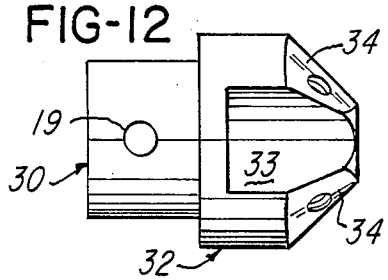
FIG. 12 is a bottom view of the structure of FIG. 10.
Figure 13:
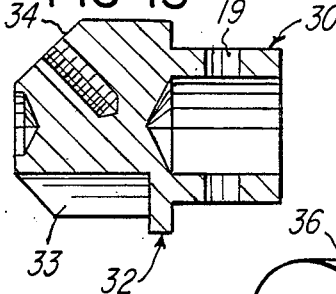
Figure 14:
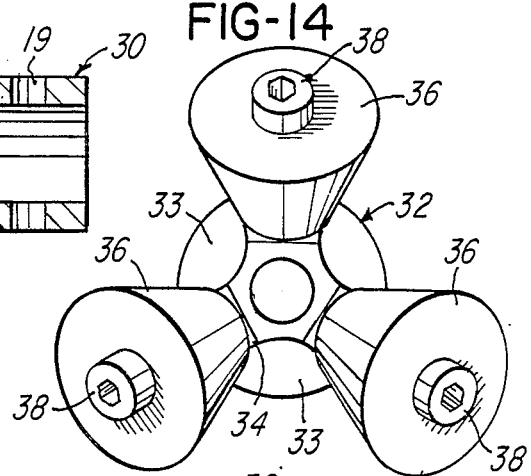
Figure 15:
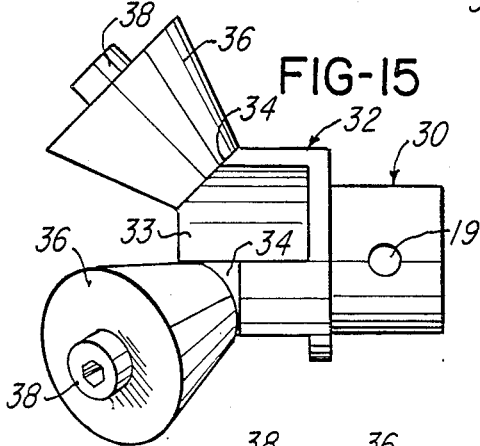
Figure 16:
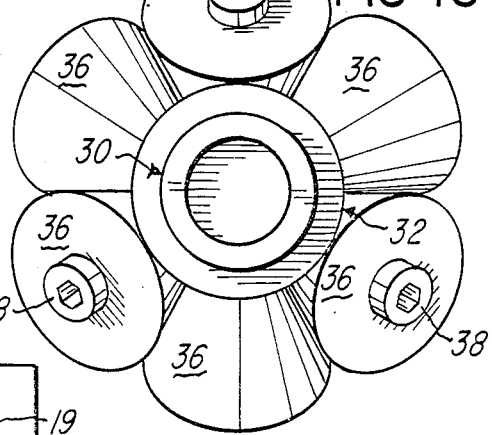
Figure 17:
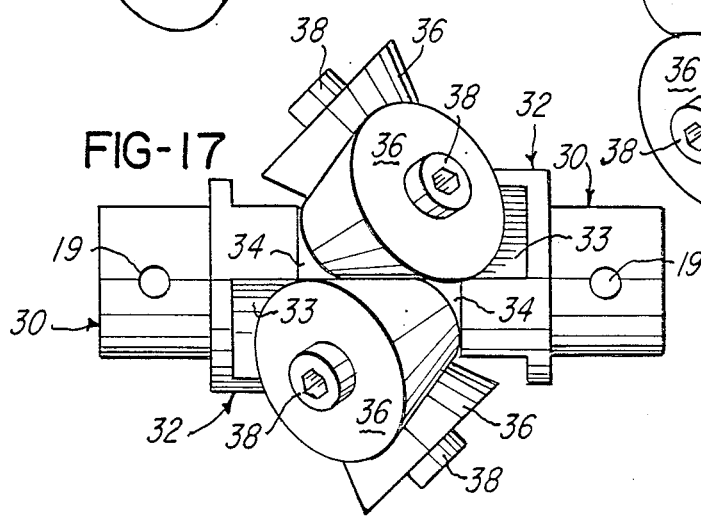

FIG. 13 exhibits a longitudinal section of the hub of FIG. 9;

FIG. 14 is a head end view of a unit assembly forming part of an embodiment of the invention which utilizes the structure of FIG. 9;

FIG. 15 is a side view of the structure shown in FIG. 14;

FIG. 16 is an end view of the assembly of a universal joint utilizing the structure of FIGS. 9-14;

FIG. 17 is a side elevation view of the structure of FIG. 16.

Like parts are indicated with like numbers throughout the several views.

It should be understood that the views are in part diagrammatic and only so much is shown therein as may be necessary for the understanding of the present invention.

FIGS. 1-6 illustrate a most simplistic embodiment of a universal joint per the invention. FIGS. 1-3 reveal an element 10 thereof comprising a tubular hub 20. Projected from one end and forming a coaxial extension of the hub 20 is a relatively short symmetrically diverging wall structure 12 the general shape of which is that of a truncated cone. The projected extremity 17 of the wall structure 12, which in this instance defines a plane substantially perpendicular to the longitudinal axis of the hub 20, is formed with three equidistantly spaced notches 14. The notches 14 are directed inwardly and longitudinally of the wall structure 12, to produce thereby a series of three circularly and equidistantly spaced, longitudinally extending, divergent fingers 16 which in a circular sense are substantially equidistantly spaced. The longitudinally extending sides 18 of each notch 14 are inwardly convergent and the width of the notch which they bound is slightly greater than that of the fingers 16, each of which is substantially identical in shape and length and the width of which is determined by the sides 18 by which it is immediately bounded. Each said notch 14 has a like depth the inner limit of which is defined by its base surface 15 at a location intermediate the length of the wall structure 12 adjacent and spaced from the portion of this wall structure which is its apex and correspondingly that portion thereof which exhibits its smallest diameter. The base surfaces 15 of the notches 14 are arcuate and mutually define, if extended, a transverse section of the wall structure 12 which is substantially parallel to the outer end surfaces of the fingers 16.

The end portion of the hub 20 remote from the fingers 16 is formed for the coupling thereof to an end of a shaft element (not shown) forming part of a drive system in which the joint of the invention is interposed. In this instance this end portion of the hub 20 is shown to have a diametral through aperture 19 adjacent its outer extremity which on its application to an end of a shaft-like portion of a drive system in which the joint is inserted will be caused to align with a like diametral bore therein so they may commonly receive a press fit pin by means of which they are securely connected.

Two such elements 20 as above detailed may be simply, easily and very quickly interrelated to produce a universal joint in accordance with the present invention. All that need be done is to bring them into coaxial alignment with their ends which embody the divergent fingers 16 placed in a closely adjacent facing relation with the fingers of one respectively offset, in a rotative sense, from the fingers of the other to position each said finger of one said element in direct alignment with a space between adjacent fingers of the other. At this point, on a direct axial movement of one said element 20 to the other the fingers of said one element and the fingers of the other element naturally move into the spaces with which they are aligned, each to bottom on the base surface 15 which defines the inner limit of the notch 14 forming the space to which it applies. The net result of this assembly is that the fingers 16 on each of said elements in effect project through, beyond and in overlapping relation to portions of the wall structure 12 immediately of its juncture with the end of the hub 10 of which it forms an extension. As seen in FIGS. 4 and 5, the respective notched wall structures 12 each nest in part a portion of the applied wall structure in the process of which the overlapping interfit projected ends of the fingers 16 effectively cross to define therebetween, at the outer limit and circumferentially of the assembly so provided a groove 22. This assembly, as noted previously, will be inserted intermediate the limits of a drive system and by means of the remote end portions of the hubs 20 thereof, which in this case are illustrated to each have a diametral through aperture 19, coupled in obvious manner with adjacent ends of immediately upstream and downstream elements of said system by means of press fit connecting pins.

While not absolutely required, the embodiment of FIGS. 1–6 illustrate in FIGS. 4 and 5 thereof the application of a continuous coil spring 24 in the base of the groove 22 (the spring being shown only in transverse section to enable clarity of the detail of the interfit, overlapping relation of the adjacent ends of the mating elements 20). As will be seen in FIG. 5, the spring 24 serves to add a resilient tie and retention device about the interfit overlapping fingers 16 exerting a biasing influence to urge them to their original assembled positions.

This bias in the joint is over and above the significant inherent biasing influence naturally built into the assembly of the elements 20 which comes into play automatically (in a manner such as previously detailed) at such times that these elements are subjected to a relative angular displacement thereof in use and derives from the form and the construction and arrangement of their interfit overlapping end portions.

Figure 7:
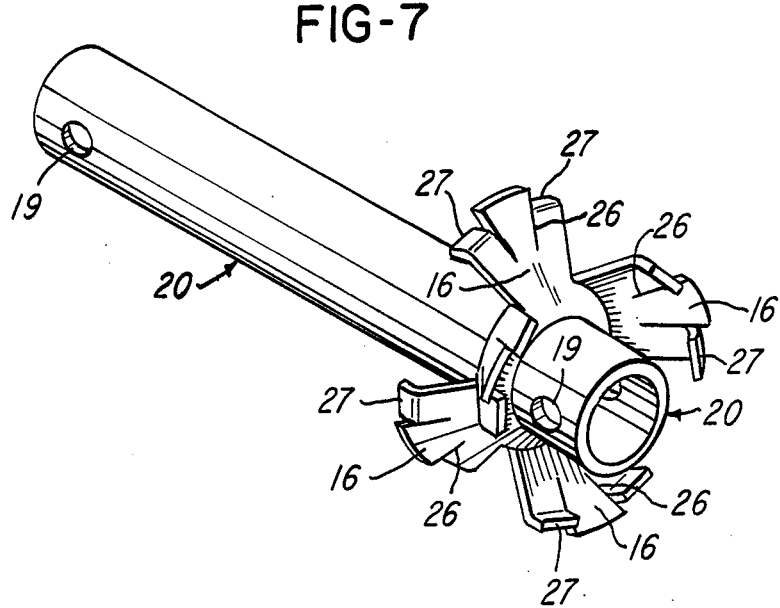
FIGS. 7 and 8 illustrate a universal joint exhibiting a modification of the component structure of the invention embodiment shown in FIGS. 1-6.
Figure 8:
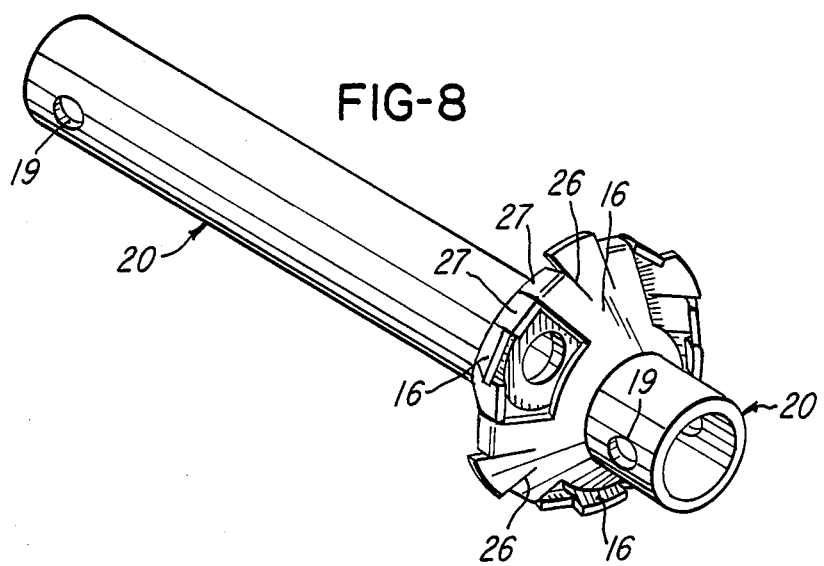

Should a customer wish to exercise extreme caution, a slight modification of the fingers 16 is made such as shown in FIGS. 7 and 8, which reveal an assembly similar to that shown in FIGS. 1–6. In this instance the fingers 16 have each been lanced at their projected extremities at two points respectively adjacent and equidistant from the lateral extremities thereof. As shown, this lancing produces in the outer extremity of each finger 16 a pair of short slits 26 which are inwardly convergent, parallel to the laterally bounding outer side surfaces of the fingers 16 and equidistant from the center of such extremity. Upon the assembly of the two basic compound elements 20 of FIGS. 1–6 modified to include the slits 26 in the outer extremities of their fingers 16, and the relative nesting and interfitting of the adjacent ends thereof as above described, it is a very simple matter to quickly and easily bend the generally rectangular tabs 27 created by the slits 26 at the respective lateral extremities of the outermost end of each finger equaly inward toward the central axis of the truncated cone shape of the wall structure 12. As should be self evident, the displacement of the tabs 27 positions their projected extremities radially inward of their previous positions to a point at which they provide, in effect, an increase in width of the corresponding radially inward portion of finger, rendering it wider in dimension than the space between the sides 18 of the notch through which said radially inward portion was initially passed in the assembly of the elements 20. Accrdingly, as seen in FIGS. 7 and 8, should, for any reason, there be an axial outward displacement of the assembled elements 20 from their initially installed positions (FIG. 7), the tabs 27 will function as positive stops which limit the extent of their relative displacement (FIG. 8) and provide supplemental insurance against the complete withdrawal and separation of the fingers of the respective elements which form the universal joint.

FIGS. 9–17 illustrate another form of embodiment of the invention which utilizes a unit or assembly in lieu of the above described coupound element of FIGS. 1–3 which is particularly advantageous where special loads must be accommodated. This unit or assembly comprises a tubular or cylindrical hub 30 integrally connected with and forming an axial extension of one end of which is a head providing thereon an adapter 32. The opposite end of the hub 30 is suitably adapted for connection to a shaft or element of a drive system in which the universal joint of which it forms a part is interposed. This adaptation may be such as previously described with reference to the hub 20.

The outermost projected end surface of the adapter 32 is formed with a pluralityof angularly related planar bearing surface portions 34 which are circularly and equidistantly spaced and mutually converge toward its projected extremity at an angle of 45 degrees to the central longitudinally extending axis of the hub 30. Each of the surfaces 34 seats, substantially perpendicular thereto, a roller type bearing element 36 having the shape of a truncated cone the smaller diameter or apex end of which bears thereon. A central throughbore in each roller element receives therethrough, for rotation of the roller element thereon, the body of a bolt 38, the head of which contains the roller for rotation on its base surface 34 as and when required. The projected threaded extremity of the bolt 38, in each case, is securely anchored in a tapped blind bore formed in the base 34 which underlies the roller to which it relates.

The adapter 32 is also formed with a series of recesses or pockets 33 in the outer peripheral surface and longitudinally of the head thereof which recesses or pockets are circularly spaced and each positioned between a pair of the successively adjacent rollers 36 and correspondingly between successively adjacent surfaces 34. These recesses or pockets 33 have their bases in line, in part, respectively, with the spaces defined between the successively adjacent roller elements 36 and, as will be seen. lend facility in the assembly of the universal joint to which such structure applies. Furthermore, it is noted that the respective spaces defined between the successively adjacent of the circularly spaced rollers are somewhat wide than the rollers per se.

The construction and arrangement so provided enables a pair of the units or assemblies of FIGS. 9–14 to be brought together to have the projections defined by their rollers 36 immediately adjacent, and the rollers of one thereof in line, respectively, with the spaces between the rollers of the other, whereupon the one may be advanced into the other thereof to have the rollers of each position in the spaces between the rollers of the other and in an interfitting overlapping relation to its adapter 32, accommodated by said recesses or pockets 33 which are formed therein. An embodiment of a universal joint in accordance with the present invention (FIGS. 16 and 17) is simply, quickly, effectively and basically established thereby.

Thus, the unit or assembly of FIGS. 9–15 provides a hub an extension in the form of a head or adapter at one end of which includes outwardly divergent projections having in their composite a generally conical disposition, each of which projections provides a roller bearing element as part thereof. Each roller bearing in and of itself has the shape of a truncated cone and said roller bearings are, in the instance illustrated, circularly and equidistantly spaced sufficiently to receive between adjacent thereof a like sized bearing element with a limited degree of clearance.

This structure clearly lends itself to the production of a unviversal joint, as does the structure of FIGS. 1–3, which achievs objectives, benefits and advantages of the present invention as first stated and on its face solves problems of serious concern in use of the prior art universal joints.

It must be emphasized that by virtue of the features of construction and arrangement of parts of a universal joint such as herein exemplified, in use of the compound element and its application illustrated by way of example in FIGS. 1–8 and the unit and assembly and application thereof illustrated by way of example in FIGS. 9–17, when said mating elements, units or assemblies are angularly displaced during their use, the rotational forces generated at the points of contact of the mating surfaces of their respective projections, whether said projections be in the form of fingers, roller bearings or otherwise, are such and so distributed as to urge and induce common movement of the interfit elements, units or assemblies towards a coaxial alignment. This insures the integrity of the joint when subjected to torsional forces, in the process of which to inhibit and preclude various of the problems referred to as found to exist in use of prior art joints. At the same time such construction and inherent function as featured in preferred embodiments of the present invention assist in the maintenance of a substantially constant velocity as between their input and output in use thereof.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A universal joint comprising a pair of coupling devices each including a hub and means defining an extension of said hub, said means including a plurality of circumferentially spaced divergent projections which are longitudinally and laterally extended, have lateral extremities which are outwardly and symmetrically divergent and define the shape of a segment of a cone, said projections having their successively adjacent side surfaces formed to define therebetween spaces the bounding sides of which are similarly divergent and have a divergency similar to that of said projections, said extensions of said hubs being configured to interfit and being interfit with the projections of each thereof relatively rotatively displaced and projected in and through the spaces defined between the bounding sides of the projections of the other of said extensions, adjacent interfitting projections defining means to maintain a relatively controlled, sliding bearing engagement thereof, one to the other, regardless of the angle of displacement, roll and slide thereof in use.

2. A universal joint as in claim 1 wherein each said projection has an outer surface the configuration of which corresponds generally to that of a longitudinally and laterally extending section of the outer peripheral surface of a cone.

3. A universal joint as in claim 1 wherein said extension and said projections of each said coupling device is coaxial with its hub and portions of said projections include means to limit their relative axial displacement.

4. A universal joint as in claim 1 wherein said projections of each said coupling device are at least three in number.

5. A universal joint as in claim 1 wherein said extension of said hub of each said coupling device is defined by projections each of which has the shape of a longitudinally extending segment of a truncated cone.

6. A universal joint as in claim 1 wherein at a location beyond each said hub its said extension to the outer end thereof has a generally conically expanding shell-like configuration which is circular in transverse section and includes circularly and equidistantly spaced notches directed inwardly of and opening from its projected extremity to define said projections and produce spaces therebetween shaped similarly to but slightly wider than said projections.

7. A universal joint comprising a pair of coupling devices normally in a coaxial relation, each said coupling device including a cylindrical portion integrally connected with and forming an extension of one end of which is an adapter presenting at an axially projected portion thereof a plurality of angularly related base surfaces which are circularly and equidistantly spaced, each said angularly related base surface mounting thereon, with its central longitudinally extending axis substantially perpendicular thereto, a roller type bearing element, said bearing element having a shape substantially that of a truncated cone the smaller diameter end of which is adjacent the base surface to which it perpendicularly relates, said roller type bearing elements forming projections from said adapter which are outwardly divergent and circularly spaced in a substantially conical pattern and said coupling devices respectively having their said projections relatively rotatively displaced and projected in and through the spaces defined between the bounding sides of the projections of the other, the size and disposition of each said projection being such to substantially bridge the space between the projections by which it is bounded to establish their adjacent opposite expanding surfaces immediately of one another and provide conical surfaces which are adapted to slidably and bearingly interrelate to accommodate a varying degree of rotational, axial and angular movement therebetween in use of the joint of which they form a part and, on occurrence of a relative angularity therebetween as they rotate in use, respond to the rotational forces generated at such surface portions of said projections as are then in contact to urge said coupling devices towards a coaxial relation.

8. A universal joint comprising a pair of coupling devices each including a generally cylindrical portion having means defining an extension of one end thereof, said means including a plurality of circumferentially spaced outwardly divergent projections, said projections having their successively adjacent side surfaces formed to define therebetween spaces the bounding sides of which are divergent, said extensions being configured to interfit, the projections of each thereof being relatively rotatively displaced and each projected in, through and in a substantially bridging relation to one of the spaces defined between the bounding sides of the projections of the other of said extensions and said projections of each said coupling device being shaped and spaced to have a longitudinal and lateral overlapping sliding relation thereof to the projections of the other to provide means to maintain a relatively controlled, sliding bearing engagement of one of said devices to the other regardless of angle of displacement, roll and slide thereof in use.

9. A universal joint as in claim 8 wherein each projection of each said coupling device has a configuration which defines a shape corresponding generally to that of a truncated cone.

10. A universal joint as in claim 8 wherein each projection of said coupling devices has a generally conical configuration and presents at its exterior, along the length thereof, a generally conical surface configuration.

11. A universal joint comprising a pair of coupling devices, one including means for the connection thereof to a driving means and the other including means for the connection thereof to a driven means, said coupling devices having mating parts operatively linking one to the other, each of said mating parts including a plurality of projections which are generally conically divergent in the direction of the other and circularly spaced, said projections of each of said mating parts having their successively adjacent side surfaces formed to define therebetween spaces the bounding sides of which are divergent in the direction of their projected extremities, said projections of said respective mating parts, as the said parts are assembled, being interfit with the projections of each thereof relatively rotatively displaced and projected in, through and beyond the spaces defined between the bounding sides of the projections of the other of said parts, said projections of said parts being laterally expanded and having an angularity of the divergent bounding sides thereof which on a sliding bearing engagement of adjacent of said bounding sides urges and produces a bias of said coupling devices towards the relative positions which they were caused to assume on their installation to provide the universal joint.

12. A universal joint as in claim 11 characterized in that said mating parts have a substantially coaxial relation as assembled in the first instance and said respective shapes and dispositions of said projections are such to dictate that during a relative angular displacement of said mating parts and bearing contact between portions of said projections on rotation of said joint in use thereof forces are inherently generated to induce and urge said mating parts toward a coaxial relation.

13. A universal joint as in claim 11 characterized in that the widths of the spaces between the successively adjacent side surfaces of said projections of each of said mating parts are dimensionally larger along their lengths than the widths of the projections which they accommodate in the forming of said joint.

14. A universal joint as in claim 11 wherein the widths of the spaces between successively adjacent side surfaces of said projections of each of said mating parts, along the lengths thereof, are greater than the widths of the respective projections which they accommodate in the forming of said universal joint.

15. A universal joint comprising substantially like coupling devices in end to end relation, said devices comprising a hub having means defining a substantially conically expanding extension of one end thereof, at least the outer end portion of said extension comprising a plurality of longitudinally extending broad, laterally expanding, diverging fingers, adjacent sides of adjacent fingers being separated by and laterally bounding an outwardly diverging notch opening between their projected extremities, said notches of each said device being complementary in shape to that of the fingers of the other and the fingers of each said device being respectively projected through the notches of the other to have portions thereof laterally and longitudinally overlap, at least in part, the side portions of the fingers which laterally bound the notch through which each projects to provide a slip, sliding interfit of said devices operative to maintain a relatively controlled sliding, bearing engagement of one to the other irregardless of angle of displacement, roll and slide of said devices in use.

16. Apparatus as in claim 15 wherein said fingers of said devices are at least three in number.

17. A universal joint comprising substantially like coupling devices in end to end relation, said devices each comprising a hub having means defining a substantially conically expanding extension of one end thereof including, outwardly of said one end, at least three longitudinally extending, laterally expanding, diverging projections, adjacent sides of adjacent projections being separated by and laterally bounding an outwardly diverging space opening between their projected extremities, said spaces of each said device being complementary in shape to that of the projections of the other and the projections of each said device being respectively projected through the spaces of the other to have portions thereof, at least in part, laterally and longitudinally overlap the side portions of the fingers which laterally bound the space through which each projects to provide a slip, sliding interfit of said devices operative to maintain a controlled sliding bearing engagement of one to the other irregardless of angle of displacement, roll and slide of said devices in use thereof.

18. Apparatus as in claim 17 wherein said projections of of said devices are three in number and each thereof has the outline of a segment of a truncated conical shell.

* * * * *

UNITED STATES PATENT AND TRADEMARK OFFICE
CERTIFICATE OF CORRECTION

PATENT NO. : 4,840,601

DATED : June 20, 1989

INVENTOR(S) : Stephen A. Denman

It is certified that error appears in the above-identified patent and that said Letters Patent is hereby corrected as shown below:

Col. 6, line 15, "pluralityof" is corrected to read -- plurality of --;

line 41, delete the period and substitute a comma therefor;

line 45, "wide" is corrected to read -- wider --.

Col. 7, line 5, "achievs" is corrected to read -- achieves --.

Signed and Sealed this

Thirteenth Day of March, 1990

Attest:

JEFFREY M. SAMUELS

*Attesting Officer*  *Acting Commissioner of Patents and Trademarks*